2,749,503

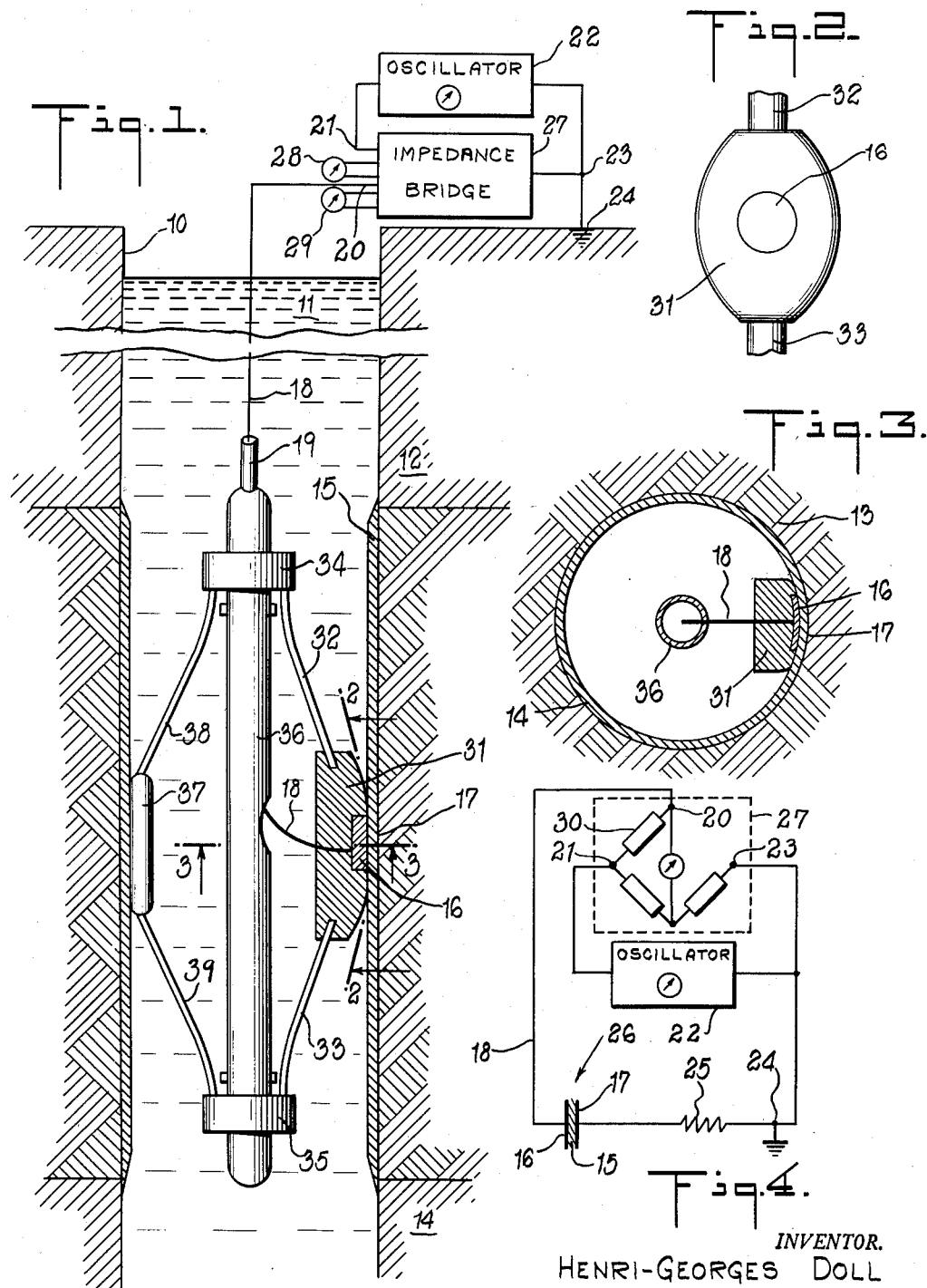
June 5, 1956 — HENRI-GEORGES DOLL — 2,749,503
ELECTRICAL LOGGING IN NON-CONDUCTIVE DRILLING LIQUIDS
Filed Nov. 28, 1951 — 2 Sheets-Sheet 1
INVENTOR.
HENRI-GEORGES DOLL
BY Campbell, Brumbaugh, Free & Graves
HIS ATTORNEYS June 5, 1956   HENRI-GEORGES DOLL   2,749,503
ELECTRICAL LOGGING IN NON-CONDUCTIVE DRILLING LIQUIDS
Filed Nov. 28, 1951   2 Sheets-Sheet 2
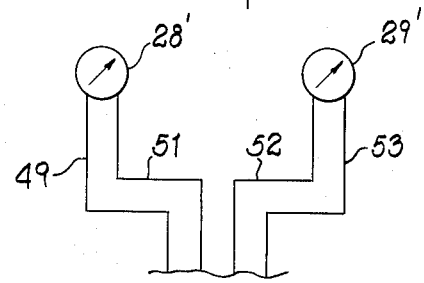
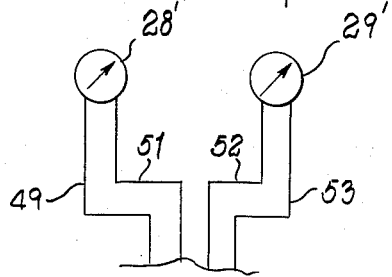
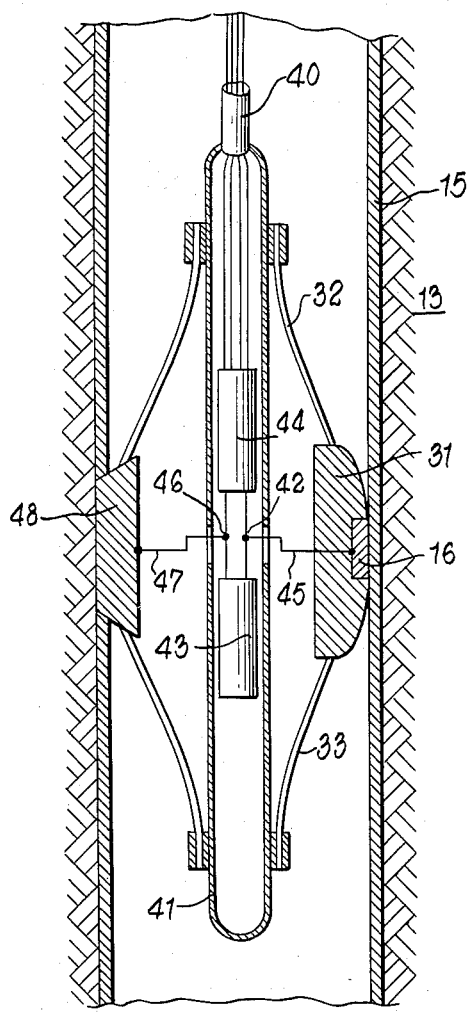
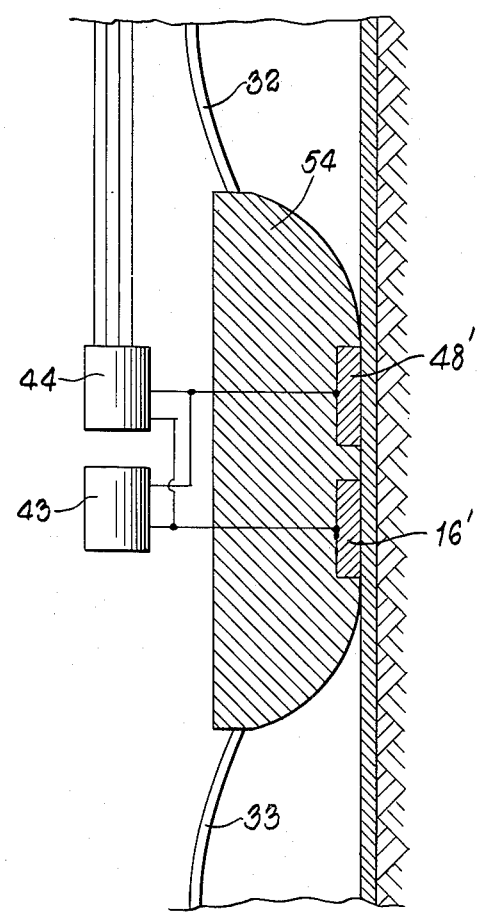
INVENTOR.
HENRI-GEORGES DOLL
BY
Campbell, Brumbaugh, Free & Graves
HIS ATTORNEYS United States Patent Office 2,749,503
Patented June 5, 1956

ELECTRICAL LOGGING IN NON-CONDUCTIVE DRILLING LIQUIDS

Henri-Georges Doll, Ridgefield, Conn., assignor to Schlumberger Well Surveying Corporation, Houston, Tex., a corporation of Delaware Application November 28, 1951, Serial No. 258,616

14 Claims. (Cl. 324—1)

The present invention relates to electrical logging in non-conductive drilling liquids and, more particularly, to novel methods and apparatus for obtaining indications of the resistivity of formations traversed by a borehole filled with oil-base mud and for determining which of said formations are permeable.

It is becoming increasingly popular to employ substantially non-conductive drilling liquids, such as oil-base muds, when drilling boreholes into the earth. Unfortunately the extremely high resistivity of these drilling liquids substantially prohibits the use of conventional electrical logging methods such as those disclosed in Patents Nos. 1,819,923 and 1,913,293, granted August 18, 1931, and June 6, 1933, respectively, to Conrad Schlumberger, for example. These methods of electrical resistivity and spontaneous potential logging require a current flow through the borehole liquid in the vicinity of measuring electrodes in order to determine the characteristics of formations traversed by the borehole.

It is an object of the invention to provide novel methods and apparatus for the electrical logging of the boreholes containing electrically non-conductive liquid.

A further object of the invention is to provide novel methods and apparatus for locating permeable formations traversed by a borehole containing oil-base mud by obtaining indications of the presence of mud cake on the walls of such formations.

Another object of the invention is to provide novel methods and apparatus for obtaining an electrical resistivity log of formations traversed by a borehole containing electrically non-conductive liquid, e. g. oil-base mud, and, if desired, simultaneously determining which of said formations are permeable.

As is well known, when a borehole is filled with drilling liquid containing finely divided solids in suspension, filtrate from such liquid tends to invade permeable formations leaving a thin layer of solids or mud cake on the wall of the borehole opposite such formations. Electrically non-conductive liquids, such as, for example, oil-base mud, deposit a highly-resistive coating under these conditions. This coating acts as an insulator or dielectric between the interior of the borehole and the relatively low resistance of the formation.

The objects of the invention are attained by utilizing the mud cake as a dielectric between the two sides of an effective capacitor. In the absence of the mud cake opposite impermeable formations, the dielectric becomes very thin, the capacitance increases abruptly, and the capacitive reactance decreases to a small value. The location and thickness of permeable and impermeable formations is accordingly determined by measuring the impedance or capacitive reactance of the effective capacitor as a function of depth in the borehole.

More specifically, the invention resides in substantially excluding the electrically non-conductive liquid from a portion of the wall of the borehole and measuring a quantity dependent upon the reactance, such as the capacitance, of material between said wall portion and the surface of the earth formation lying immediately therebehind.

The liquid may be excluded from the wall portion by means of a movable electrode adapted to fit the contour of the wall of the borehole and to squeeze out substantially all the liquid under the same when it is pressed against the wall of the borehole.

A constant amplitude alternating potential is normally applied across the wall portion between the formation and the electrode. The potential may be applied from one side of a source through a conventional circuit directly to the electrode. The other side of the source is connected to the formation either by being grounded at the surface of the earth or by means of a second electrode which is pressed against the wall of the borehole at substantially the same depth as the first electrode for the purpose of conductively or capacitatively coupling to the formation.

The invention will be more fully understood from the following detailed description of several representative embodiments, taken in conjunction with the accompanying drawings in which:

Figure 1 illustrates one embodiment of the invention employing a capacitative electrode pressed against the side of a borehole filled with oil-base mud;

Figure 2 is a front elevation view of the electrode and its mounting taken along a dashed line 2—2 of Figure 1 looking in the direction indicated by the arrows;

Figure 3 is a transverse sectional view of the electrode and its mounting taken along a dashed line 3—3 of Figure 1 looking in the direction indicated by the arrows;

Figure 4 is an electrical circuit diagram equivalent to the arrangement of Figure 1;

Figure 5 illustrates another embodiment of the invention employing a capacitative electrode in a pad and a grounding electrode which is adapted to make a low impedance coupling with the wall of the borehole; and Figure 6 illustrates a further embodiment of the invention employing two capacitative electrodes in a pad.

In Figure 1 a borehole 10, containing a substantially electrically non-conductive drilling liquid 11, such as oil-base mud, is shown traversing a plurality of formations 12, 13 and 14. The absence of mud cake on the walls of the formations 12 and 14 indicates that these formations are impermeable. On the wall of the formation 13, a highly resistive oil-base mud cake 15 is formed revealing that this formation is permeable.

An electrode 16, preferably circular, as shown in Figure 2, and adapted to fit tightly against the wall of the borehole 10, as shown in Figure 3, is arranged to be moved along the borehole in any convenient manner. The electrode 16 is pressed against the mud cake 15 which adheres to the permeable formation 13 and separates the electrode 16 from an adjacent portion 17 of the wall of the borehole 10. An insulated conductor 18 connects the electrode 16 through a cable 19 to a terminal 20 on a four-terminal impedance bridge 27. An adjacent terminal 23 of the bridge 27 is grounded to the earth at a point 24. A suitable source of alternating voltage 22 is connected across the bridge 27 between the terminal 23 and a diagonally opposite terminal 21.

The voltage available between the terminals 20 and 23 of the impedance bridge 27 appears with somewhat diminished amplitude between the electrode 16 and the wall portion 17 as a result of the electrical resistance between the point 24 and the wall portion 17. This resistance is primarily dependent upon the resistivity of the formation 13 near the wall portion 17. The electrode 16 and the wall portion 17 act as the two sides of a capacitor having the mud cake 15 as a dielectric therebetween.

An equivalent electrical diagram of the circuit of Figure 1 is shown in Figure 4. The alternating voltage source 22 is connected in series with a resistor 25 having a resistance R representing the resistivities of the formations, and a capacitor 26 having a capacitance C formed by the electrode 16, the mud cake 15, the wall portion 17, and an arm 30 of the impedance bridge 27. The impedance Z between the electrode 16 and the grounded point 24 is given by the expression $$Z = jX_c + R \quad (1)$$

where $$X_c = \frac{1}{2\pi f C} \quad (2)$$

and $f$ is the frequency of the alternating voltage from the source 22. It can readily be seen that by properly selecting the area of the electrode 16, whereby the capacitance C may have a desired value for a given thickness of mud cake, and by appropriately choosing the frequency $f$, the capacitative reactance $X_c$ may be made much greater than the resistance R so that $$Z \cong X_c \quad (3)$$

when mud cake is present on the wall of the borehole opposite the electrode 16.

Accordingly, if the alternating current impedance bridge 27 is designed to give indications only when the impedance is greater than a given value, say when Z is greater than R, then the bridge 27 will give an indication only when the electrode 16 is opposite the mud cake which forms on permeable formations. On the other hand, when the electrode 16 is pressed against impermeable formations on which no mud cake dielectric can form, C becomes extremely large and thus the capacitative reactance $X_c$ correspondingly low. Under these conditions the impedance Z has only a small value attributable to the resistance R. Therefore, only permeable formations will give indications on the impedance bridge 27 as the electrode 16 is moved along the wall of the borehole 10.

A suitable frequency for measurements of substantially only the capacitative reactance $X_c$ is on the order of 200 kilocycles a second, for example. The diameter of the electrode 16 should be somewhat greater than the thickness of any mud cake that may be encountered along the wall of the borehole 10 which is usually of the order of a fraction of an inch as indicated in the applicant's copending application Serial No. 122,102, filed October 18, 1949, for "Resistivity Method and Apparatus for Obtaining Indications of Permeable Formations Traversed by a Bore Hole," now Patent No. 2,669,690.

If, in accordance with the above reasoning, a frequency is selected such that the resistance R due to the formations is neglibe and the presence of mud cake is indicated only by reactance variations, it will be desirable to obtain simultaneously or separately a log of the resistivities of the formations. This may be accomplished, for example, by the inductive logging methods and apparatus described in my copending application Serial No. 99,300, filed June 15, 1949, and entitled "Electromagnetic Well Logging Systems," now Patent No. 2,582,314, whereby the resistivities of the formations may be determined, even though the borehole traversing the same is filled with oil-base mud.

Alternatively, a higher frequency $f$ may be employed such that the resistance R is not negligible compared to the reactance $X_c$ in the Relation 1 above. For example, the frequency $f$ may be made equal to 10 megacycles a second. In Figure 1 the impedance bridge 27, which may be of the type disclosed in Broding Patent No. 2,535,666, provides indicators 28 and 29 with quantities representing the capacitance C and the resistance R, respectively. These values are preferably simultaneously indicated as a function of the depth of the electrode 16 in the borehole 10. The indicator 28 will show the presence or absence of mud cake on formations by capacitance indications, thereby determining whether such formations are permeable. The indicator 29 when properly calibrated will give resistivity indications, which are primarily a function of the resistivity of the formations in the vicinity of the electrode 16.

The electrode 16 may be maintained against the wall of the borehole 10 in any convenient manner. For example, the apparatus disclosed in my copending application Serial No. 122,102, filed October 18, 1949, for "Resistivity Method and Apparatus for Obtaining Indications of Permeable Formations Traversed by a Bore Hole," now Patent No. 2,669,690, may be employed. As shown in Figure 1, the electrode 16 may be imbedded in an insulating pad 31 so as to slide freely along the wall of the borehole 10. The pad 31 is pressed against the wall by means of spring arms 32 and 33 which are mounted on sleeves 34 and 35, respectively. The sleeves 34 and 35 are adapted to slide on a cylindrical housing 36, which is centered in the borehole 10 by means of a back-up pad 37 and spring arms 38 and 39 which are similar to arms 32 and 33, respectively, and oppose the same. The housing 36 may be raised and lowered through the borehole 10 by means of the electrical cable 19 and a winch (not shown) at the surface of the earth. The conductor 18 may pass through the housing 36 as well as the cable 19 on the way from the electrode 16 to the electrical equipment at the surface of the earth.

The pad 31 is manufactured from such insulating material as oil-resistant, non-conductive rubber and is preferably large enough to eliminate any appreciable capacitative effect between the electrode 16 and the arms 32 and 33. The electrode 16 may be manufactured from any flexible electrically conductive material, for example, conductive neoprene or any conductive rubber, in order that the electrode may readily bend to fit the contours of the wall of the borehole.

At the high frequencies mentioned above, the long conductor 18 in the cable 19 may offer electrical difficulties unless extreme care is taken. Accordingly, the embodiments shown in Figures 5 and 6 may be employed to reduce the length of the conductors that are required to transmit high frequency current.

In Figure 5 the electrode 16 may be pressed against the wall of the borehole 10 in the same manner as in Figure 1. Thus, the electrode 16 is mounted in the pad 31 and is forced against the wall of the borehole 10 by means of the springs 32 and 33 mounted on a housing 41 suspended by an electrical cable 40. In this embodiment, however, an alternating voltage source 43 and an impedance bridge 44, which may be of the type disclosed in Broding Patent No. 2,535,666, are placed within the housing 41, which is preferably pressure resistant. An output terminal 42 of the source 43 is connected to the electrode 16 by a conductor 45, which may, for example, be the center conductor of a coaxial cable. A second output terminal 46 of the source 43 is connected by a conductor 47, similar to conductor 45, to a second electrode 48 which may, for example, serve as the back-up pad for the housing 41.

The electrode 48 has a relatively large area in close proximity to the wall of the borehole and accordingly provides a low impedance coupling to the formation 13. The electrode 48 may be adapted to cut through any mud cake on the wall of the borehole and make actual contact with the formation 13. As a result, the potential drop between the electrode 48 and the adjacent formation will have a substantially constant low value as the electrode 48 is moved. Even if the contact between the electrode 48 and the formation is not maintained, substantially no variations in potential drop will occur due to the extremely large capacitance between the over-sized electrode 48 and the adjacent formation.

Since the electrode 48 is substantially at the potential of the formation, variations in potential difference between the electrodes 16 and 48 will be caused by variations in capacitance between the electrode 16 and the formation 13 and by variations in the resistivity of the formation 13 in the vicinity of electrode 16, as described in connection with Figure 1. Accordingly, the impedance bridge 44 is connected between the electrodes 16 and 48 at the terminals 42 and 46, and the potential variations indicative of capacitive reactance and resistance are transmitted to the earth's surface through the cable 40 by conductors 49, 51 and 52, 53, respectively, to the indicating devices 28' and 29'. These potential variations are unidirectional or are alternating voltages having a frequency low compared to the frequency of the voltages applied to the electrodes 16 and 48. Accordingly, the output voltages of the impedance bridge 44 may be readily transmitted through cable 40 without appreciable attenuation.

Of course, the electrode 48 in Figure 5 may take many forms. For example, a scratching electrode may be employed, or any other grounding device for maintaining electrical contact with the formations.

However, it is not necessary that the second electrode have an impedance to the adjacent formation that is low relative to the capacitive reactance between the electrode 16 and the same formation. For example, in Figure 6 two spaced circular electrodes 16' and 48' are placed in a pad 54, similar to the pad 31 in Figures 1 and 5. The electrical equipment may be designed and placed exactly as the equipment shown in Figure 5. The alternating voltage from the source 43 is impressed across the electrodes 16' and 48' in the pad 54, and the variations in reactance and resistance measured by means of the bridge 44 connected between electrodes 16' and 48' are indicated by indicators 28' and 29'. The indications will have the same significance as those obtained with the apparatus shown in Figures 1 and 5 although the capacitance between electrodes 16' and 48' tends to be greater due to the proximity of the two electrodes.

It is to be understood that various modifications may be made in the illustrated embodiments. For example, electrodes 16' and 48' in Figure 6 may be placed in separate pads disposed on opposite sides of the borehole. Accordingly, the invention is limited only by the scope of the appended claims.

What is claimed is:

1. A method of logging a borehole containing substantially non-conductive liquid in which finely divided solids are suspended, the filtrate from said liquid tending to invade permeable formations traversed by the borehole and leave a highly resistive mud cake on the wall thereof, comprising the steps of sliding an electrode along the wall of the borehole in engagement therewith and over any mud cake that may be present, and detecting the mud cake in terms of the capacitive reactance between the electrode and the formation behind the same.

2. A method of logging a borehole containing substantially non-conductive liquid in which finely divided solids are suspended, the filtrate from said liquid tending to invade permeable formations traversed by the borehole and leave a highly resistive mud cake on the wall thereof, comprising the steps of maintaining the surface of an electrode in substantial coincidence with a portion of the interface between the well liquid and the solid material surrounding the same, thereby squeezing out substantially all the liquid between said electrode and said interface portion, and indicating a quantity dependent upon the capacitive reactance between the electrode and the formation behind the same as a measure of any mud cake that may be present.

3. A method of logging a borehole containing substantially non-conductive liquid in which finely divided solids are suspended, the filtrate from said liquid tending to invade permeable formations traversed by the borehole and leave a highly resistive mud cake on the wall thereof, comprising the steps of maintaining the surface of an electrode in substantial coincidence with a portion of the interface between the well liquid and the solid material surrounding the same, thereby squeezing out substantially all the liquid between said electrode and said interface portion and measuring the capacitive reactance between the electrode and the formation behind the same as the electrode is moved along the borehole, thus locating any mud cake that may be present.

4. A method of logging wells containing substantially non-conductive liquid in which finely divided solids are suspended, the filtrate from said liquid tending to invade permeable formations traversed by the borehole and leave a highly resistive mud cake on the wall thereof, comprising the steps of substantially excluding said liquid from a portion of the interface between said liquid and the surrounding solid material, applying an alternating potential between said interface portion and a point spaced apart therefrom, and indicating a quantity depending upon the capacitive reactance of material between said interface portion and the surface of the earth formation lying immediately therebehind.

5. A method of logging wells as defined in claim 4 in which an electrode is pressed against said interface portion and the alternating voltage is applied between said electrode and a reference point spaced apart therefrom, the frequency of said alternating voltage being high enough to make the reactance of any mud cake formed on a permeable formation substantially greater than the formation resistance at the same level.

6. In a method of logging a borehole containing substantially non-conductive liquid in which finely divided solids are suspended, the filtrate from said liquid tending to invade permeable formations traversed by the borehole and leave a highly resistive mud cake on the wall thereof, comprising the steps of substantially excluding said liquid from a portion of the interface between the well liquid and the surrounding solid material, forming in situ an effective capacitor, the dielectric for which includes the solid material immediately adjacent said interface portion, and obtaining indications representative of the capacitance of said capacitor.

7. Apparatus for logging wells containing substantially electrically non-conductive liquid comprising an electrode movable in a borehole, and adapted to ride over any mud cake formed at the levels of permeable formations without cutting substantially thereinto, means for pressing said electrode transversely of the borehole to substantially exclude said liquid from a portion of the wall of the borehole, and means for measuring the capacitive reactance of material between said wall portion and the surface of the earth formation lying immediately therebehind.

8. Apparatus for logging wells containing substantially electrically non-conductive liquid comprising an electrode formed with a surface adapted to slide over any mud cake that may be present on the wall of a borehole, means for pressing said electrode transversely of the borehole to substantially exclude said liquid from a portion of the wall of the borehole, means for applying alternating voltage between said electrode and the formation immediately behind the same, and means for measuring the capacitance of the material between said electrode and said formation.

9. Apparatus for logging wells containing substantially electrically non-conductive liquid comprising an electrode movable in a borehole and adapted to ride over any mud cake formed in the vicinity of a permeable formation without cutting substantially thereinto, means for pressing said electrode transversely of the borehole to substantially exclude said liquid from a portion of the wall of the borehole, means for applying alternating voltage between said electrode and the formation lying immediately behind the same, and means for measuring the capacitive reactance of material between said electrode and said formation.

10. Apparatus for logging wells containing substantially electrically non-conductive liquid comprising two electrodes movable in a borehole, at least one of said electrodes being adapted to ride over any mud cake formed at the level of a permeable formation without cutting substantially thereinto, means for pressing said electrodes transversely of the borehole to substantially exclude said liquid from under said electrodes, means for applying alternating voltage between said electrodes, and means for indicating a quantity dependent upon the capacitive reactance between said electrodes.

11. Apparatus for logging wells containing substantially electrically non-conductive liquid comprising a first electrode movable in a borehole and adapted to ride over any mud cake formed at the levels of permeable formations without substantially cutting thereinto, means for pressing said first electrode transversely of the borehole to substantially exclude said liquid from a portion of the wall of the borehole, a second electrode providing a low impedance coupling with the earth formation existing at substantially the same level as said first electrode, means for applying alternating voltage between said electrodes, and means for measuring the capacitive reactance between said electrodes.

12. Apparatus for logging wells containing substantially electrically non-conductive liquid comprising an insulating pad movable in a borehole, a first electrode mounted on said pad and adapted to ride over any mud cake formed at the levels of permeable formations without cutting substantially thereinto, means for resiliently pressing said pad transversely of the borehole to substantially exclude said liquid from under said electrode, a second electrode providing a low impedance coupling with the wall of the borehole at substantially the same level as said first electrode, means for applying an alternating potential between said electrodes, and means for indicating a quantity dependent upon the capacitive reactance between said electrodes.

13. Apparatus for logging wells containing substantially electrically non-conductive liquid comprising an insulating pad movable in a borehole, a first electrode mounted on said pad and adapted to ride over any mud cake formed at the levels of permeable formations without cutting substantially thereinto, means for resiliently pressing said pad transversely of the borehole to substantially exclude said liquid between the electrode and the wall of the borehole, a second electrode for contacting the wall of the borehole at substantially the same level as said first electrode, means for applying an alternating potential between said electrodes, and means for indicating a quantity dependent upon the capacitive reactance between said electrodes.

14. Apparatus for logging wells containing substantially electrically non-conductive liquid comprising an insulating pad movable in a borehole, two spaced electrodes mounted on said pad both of said electrodes being adapted to ride over any mud cake formed at the levels of permeable formations without cutting substantially thereinto, means for resiliently pressing said pad transversely of the borehole to substantially exclude said liquid from under said electrodes, means for applying an alternating potential between said electrodes, and means for indicating a quantity representative of the capacitive reactance between said electrodes.

References Cited in the file of this patent

UNITED STATES PATENTS

| | | |
|---|---|---|
| 2,233,420 | Leonardon | Mar. 4, 1941 |
| 2,297,754 | Ennis | Oct. 6, 1942 |
| 2,427,950 | Doll | Sept. 8, 1947 |
| 2,552,428 | Hildebrandt | May 8, 1951 |
| 2,564,861 | Sherborne | Aug. 21, 1951 |